Nov. 4, 1969  R. L. FISHER, JR., ETAL  3,475,813
WELDING PROCESS INVOLVING POST WELD FORMATION OF MOLTEN POOL
Filed Dec. 28, 1966
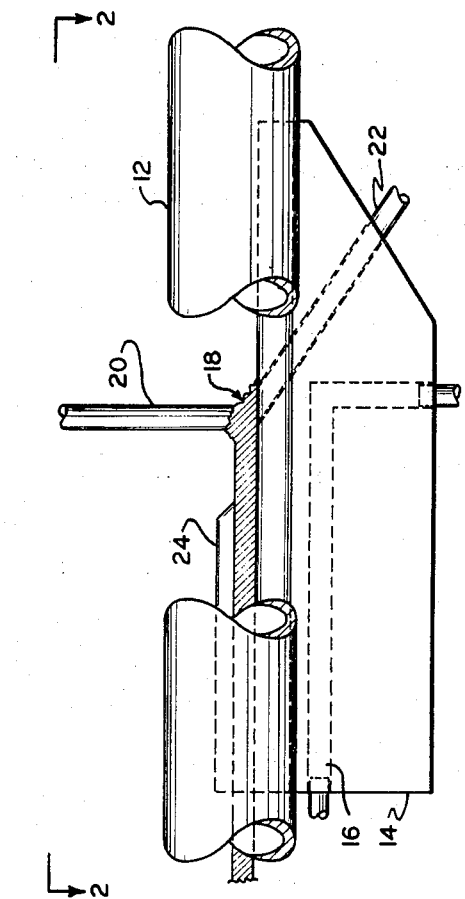
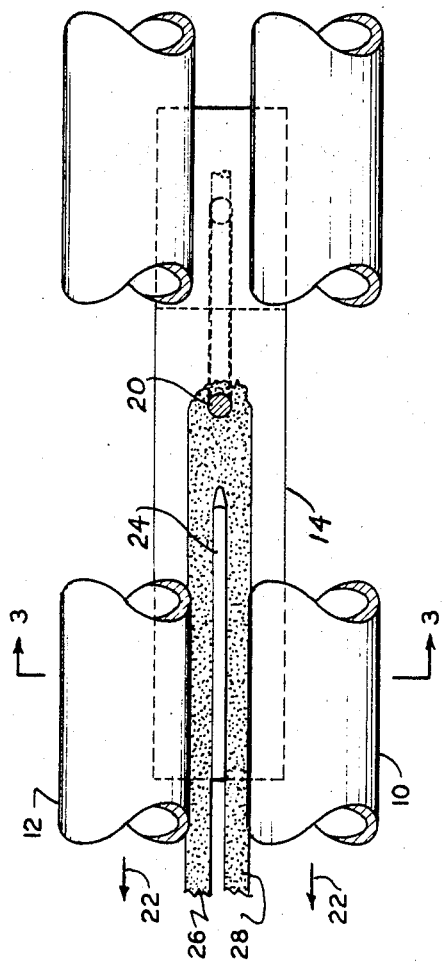
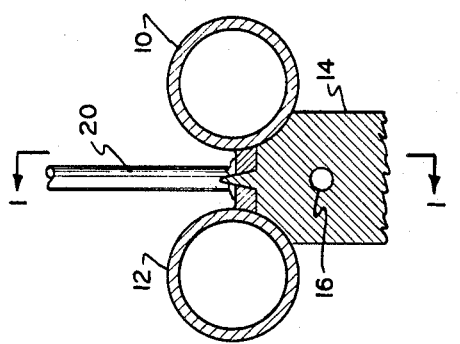
INVENTORS
RICHARD L. FISHER JR.
JAMES L. McLAIN
BY Harris G. Luther
ATTORNEY

United States Patent Office 3,475,813
Patented Nov. 4, 1969

3,475,813
WELDING PROCESS INVOLVING POST WELD FORMATION OF MOLTEN POOL
Richard L. Fisher, Jr., and James L. McLain, Chattanooga, Tenn., assignors to Combustion Engineering, Inc., Windsor, Conn., a corporation of Delaware
Filed Dec. 28, 1966, Ser. No. 605,395
Int. Cl. B23k 31/02, 29/00
U.S. Cl. 29—480                                    7 Claims

ABSTRACT OF THE DISCLOSURE

A welding process wherein the molten weld metal is deposited so that it engages the workpiece or workpieces, for example, a pair of spaced tubes. The molten weld metal as it is deposited is supported upon a suitable support and chilling bar. The weld progresses along the workpiece or workpieces and while the weld metal is in the molten condition, it is moved to a cooled forming surface where the configuration of the molten weld metal is changed to a desired shape and it is held in this shape until solidified.

BACKGROUND OF THE INVENTION

Difficulty is sometimes experienced either from an operation or an economic standpoint in the attachment by welding of various members to workpieces. One such instance is the attachment of edge bars to tubes utilized in the formation of furnace walls. It is common practice to construct the furnaces of high capacity steam generators by forming tubular panels in the shop and welding these panels together in the field in erecting the furnace. The panels are made of relatively long lengths of tubes that are positioned in parallel spaced relation and wedled together throughout their adjacent length. The edge tubes of each panel are provided with edge bars such that during welding in the field the welding operation is conducted to weld together a pair of these bars such that the field welding, where control is difficult, joins the bars rather than joining tubes or a fin to a tube where tube damage could occur. It has been the practice to provide these edge bars by hand welding in the shop a laterally extending piece of metal to the tube in the nature of a fin. In order to properly conduct a welding operation, this fin or bar must be considerably wider than it is desired to have the finished product. For instance, it might be desired to have a laterally extending bar approximately ⁵⁄₁₆". A bar ¾" may be welded to the tube and then the excess burned off to reduce it to the desired dimension.

This difficulty is overcome with the present invention by utilizing a welding process where the weld metal is formed into a desired configuration while it is in a molten condition and maintained in that configuration until it solidfies.

BRIEF DESCRIPTION

Referring to the aforementioned requirement of providing an edge bar on a tube, this can be done with the method of the present invention by positioning a pair of tubes in parallel spaced relation and providing a backing and chilling strip or bar that spans the space between the tubes and is of a desired length. Molten weld metal, as by means of arc welding, is deposited between the tubes and upon the backing strip at a localized region and this region is effectively moved throughout the length of the tubes. This may be done either by moving the tubes while the welding apparatus and the backing and chilling bar are stationary or by moving the welding apparatus and the backing and chilling bar and maintaining the tubes stationary. As the weld is moved along the length of the tube, the molten weld metal extends between the tubes and joins with the tubes. Prior to this metal solidifying, it is divided into two separate portions to form two strips, one of which extends laterally from each of the tubes, and it is thus maintained until solidified. Thus, after completing the welding task along the length of the tube, each of the tubes is formed with a laterally extending edge bar.

DRAWINGS

FIG. 1 is a side elevational view somewhat diagrammatic and fragmentary in nature of an organization for carrying out the process of the present invention;

FIG. 2 is a fragmentary top elevational view taken generally from line 2—2 of FIG. 1; and FIG. 3 is a transverse sectional view taken from line 3—3 of FIG. 2.

DESCRIPTION OF THE PREFERRED EMBODIMENT

The drawings illustrate a welding apparatus by means of which an edge bar is formed on a pair of tubes by means of a continuous welding operation. In the illustration there is provided a pair of tubes 10 and 12 which are maintained in parallel spaced relation. The tubes are placed over a backing and chilling bar 14 which is preferably water cooled with the water passage 16 being provided for the purpose. This bar 14 conforms to the configuration of the tubes 10 and 12 as best shown in FIG. 3 and bridges the space between the tubes as shown.

In the illustrative arrangement an arc welding operation is conducted at the location identified as 18 with there being a pair of consumable wire members 20 and 22 which are continuously fed at the desired rate to produce a pool of molten weld metal at the location 18 which is supported on the upper surface of the bar 14 and extends between and engages the tubes 10 and 12 being fused to the tubes.

The location 18 is moved longitudinally relative to the tubes 10 and 12 and this is preferably accomplished by moving the tubes while maintaining the chiller bar and the welding apparatus stationary. The tubes are moved in the direction of the arrows 22 such that the weld moves along the chiller bar 14 in this same direction. The chiller bar is preferably made of copper such that the weld metal does not stick to the bar. Forming part of the bar is the splitter vane 24 and this vane is so located that the weld metal as it approaches and engages the front end of this vane, which is in the form of a knife edge, is still molten. The splitter vane thus is effective to divide the weld metal into two separate strips one extending laterally from each of these tubes with these strips being identified as 26 and 28. After thus being divided by the front edge of the splitter vane, this vane, which extends along the rest of the length of the bar 14 is effective to maintain the division thus produced and the dimensioning of the bar 14 is such that the molten metal solidifies before reaching the end of the bar. Thus by mechanical means the molten weld metal is divided into two edge bars and this formation is maintained until the metal solidifies.

While the process of the invention has been illustrated and described particularly with relation to the formation of edges bar on tubes, it will be appreciated and understood that it is well adapted for the production of other results and may be utilized whenever it is desirable and advantageous to produce a particular configuration by the shaping of molten weld metal during the welding operation.

It is to be understood that the invention is not limited to the specific embodiment herein illustrated and described but may be used in other ways without departure from its spirit and that various changes can be made which would come within the scope of the invention which is limited only by the appended claims.

We claim:

1. The improved process comprising positioning an elongated terminal region of a metallic member over and in proximal relation with a generally horizontally disposed backing and chilling member, applying molten weld metal to said region and upon said backing and chilling member at a confined location without causing said metal to stick to said chilling member while causing it to fuse to said metallic member, providing relative movement between said region and said location so that the location effectively moves along said region, and after deposition but prior to solidification of the weld metal causing weld metal to pass between an upstanding portion of the backing member laterally spaced from said elongated region so as to confine at least a portion of said weld metal between the upstanding portion and the elongated region so that the weld metal forms a lateral extension of said metallic member, and thus retaining the so confined weld metal until solidified.

2. The process of claim 1 wherein the location remains stationary and the metallic member is moved.

3. The process comprising locally depositing molten weld metal between a pair of metallic members having spaced, parallel longitudinally extending portions with said deposit bridging said space, providing relative movement between said local deposit and said members such that the deposit progresses along said space, after deposit, moving the molten metal to a cooling and forming zone and thereat while molten, dividing said molten metal deposit longitudinally of said space thereby changing the configuration and forming the metal into a desired configuration and retaining the same in such configuration until solidified.

4. The process comprising moving a deposit of molten weld metal along a longitudinally extending space between a pair of spaced metallic members, said metal bridging said space and joining said members, while in the molten state, subjecting said molten metal to a splitter vane disposed to divide the metal longitudinally of said space thereby changing its configuration from that originally obtained to a desired shape, and maintaining said metal in the thus changed configuration until solidified.

5. In the process where a pair of tubes are disposed in parallel side-by-side relation with a backing and chilling bar therebetween and where, at a predetermined location, weld metal is flowed onto said bar, bridging said space, with the location effectively progressing longitudinally of the tubes, the improvement comprising continuously dividing said weld metal, prior to solidification, into a pair of longitudinal strips, one extending laterally from each tube, and maintaining the same separated, until solidified.

6. The process of claim 5, wherein said molten weld metal is thus divided by subjecting it to the action of a splitter vane.

7. The method of forming an edge bar on a pair of tubes comprising positioning the tubes in parallel spaced relation over a backing and chilling bar, locally depositing molten weld metal between said tubes and onto said bar bridging said space, moving said tubes relative to said bar and said local deposit of metal such that said deposit progresses longitudinally of the tubes, as the tubes are thus moved and prior to solidification of said molten metal subjecting the same to the action of a splitter vane thereby dividing said metal into separate longitudinal strips, one extending laterally from each tube, and thus maintaining said metal until solidified.

References Cited

UNITED STATES PATENTS

| 2,196,002 | 4/1940 | Whitney et al. | 29—528 |
| 2,395,723 | 2/1946 | Chmielewski | 29—491 |
| 2,719,210 | 9/1955 | Chapman | 29—491 X |
| 3,045,340 | 7/1962 | Kolling | 29—157.4 X |
| 3,292,217 | 12/1966 | Boehm | 29—528 |

PAUL M. COHEN, Primary Examiner

U.S. Cl. X.R.

29—157.4, 491, 526.3, 528